(12) United States Patent
Schwaiger et al.

(10) Patent No.: US 9,855,885 B2
(45) Date of Patent: Jan. 2, 2018

(54) OPERATING A LIGHTING DEVICE HAVING A PLURALITY OF LIGHT GENERATING UNITS

(71) Applicant: OSRAM GmbH, Munich (DE)

(72) Inventors: Stephan Schwaiger, Ulm (DE); Oliver Hering, Niederstotzingen (DE); Juergen Hager, Herbrechtingen (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/556,263

(22) Filed: Dec. 1, 2014

(65) Prior Publication Data

US 2015/0175053 A1 Jun. 25, 2015

(30) Foreign Application Priority Data

Dec. 19, 2013 (DE) ........................ 10 2013 226 652

(51) Int. Cl.
*B60Q 1/02* (2006.01)
*B60Q 1/04* (2006.01)
(Continued)

(52) U.S. Cl.
CPC ............. *B60Q 1/04* (2013.01); *B60Q 1/1423* (2013.01); *F21S 48/1145* (2013.01);
(Continued)

(58) Field of Classification Search
CPC .. B60Q 1/1423; B60Q 1/143; B60Q 2300/42; B60Q 2300/314; B60Q 2300/312;
(Continued)

(56) References Cited

U.S. PATENT DOCUMENTS

2006/0227087 A1 10/2006 Hajjar et al.
2006/0285216 A1* 12/2006 Yamamoto ........... G02B 27/017
359/630

(Continued)

FOREIGN PATENT DOCUMENTS

CN 102939500 A 2/2013
EP 2359605 B1 1/2013
WO 2011160680 A1 12/2011

OTHER PUBLICATIONS

German Search Report issued for the parallel German application 10 2013 226 652.9 dated Dec. 4, 2014.
(Continued)

*Primary Examiner* — Alexander H Taningco
*Assistant Examiner* — Christian L Garcia
(74) *Attorney, Agent, or Firm* — Viering, Jentschura & Partner mbB

(57) ABSTRACT

A method for operating a lighting device comprising n>1 light generating units configured to generate a respective primary light beam and comprising a phosphor surface spaced apart from the light generating units is provided. The method may include illuminating an i-th partial surface of the phosphor surface by i light generating units if a desired positive brightness value on this illuminated partial surface falls below or reaches a next higher i-th brightness threshold value from a group of n−1 positive, progressively increasing brightness threshold values; otherwise illuminating by n light generating units; wherein i and n are whole natural numbers and i=[1, . . . , n] holds true.

8 Claims, 4 Drawing Sheets

(51) Int. Cl.
*B60Q 1/14* (2006.01)
*F21S 8/10* (2006.01)
*H05B 37/02* (2006.01)

(52) U.S. Cl.
CPC .......... *F21S 48/1721* (2013.01); *B60Q 1/143* (2013.01); *B60Q 2300/312* (2013.01); *B60Q 2300/314* (2013.01); *B60Q 2300/42* (2013.01); *F21S 48/1154* (2013.01); *F21S 48/1186* (2013.01); *F21S 48/1757* (2013.01); *H05B 37/02* (2013.01)

(58) Field of Classification Search
CPC ............... B60Q 2300/054; H05B 37/02; F21S 48/1186; F21S 48/1109; F21S 48/1154; F21S 48/10; F21S 48/1757; Y02B 20/202; B60R 1/12
USPC .... 315/82, 77, 83, 291, 307; 307/10.8, 10.1, 307/157; 362/465, 466, 276, 507, 545, 362/543
See application file for complete search history.

(56) References Cited

U.S. PATENT DOCUMENTS

| | | | |
|---|---|---|---|
| 2009/0046474 A1* | 2/2009 | Sato | B60Q 1/076 362/466 |
| 2011/0249460 A1 | 10/2011 | Kushimoto | |
| 2012/0039072 A1 | 2/2012 | Lell et al. | |
| 2013/0058114 A1 | 3/2013 | Reiners | |
| 2014/0029282 A1* | 1/2014 | Ravier | F21S 48/17 362/510 |
| 2014/0340295 A1* | 11/2014 | Zhang | H05B 33/0809 345/102 |
| 2015/0124466 A1* | 5/2015 | Kushimoto | B60Q 1/085 362/466 |

OTHER PUBLICATIONS

Office Action issued for the parallel Chinese application 201410795425.6 dated Apr. 28, 2017 (for Information purpose only).

* cited by examiner

OPERATING A LIGHTING DEVICE HAVING A PLURALITY OF LIGHT GENERATING UNITS

CROSS-REFERENCE TO RELATED APPLICATION

This application claims priority to German Patent Application Serial No. 10 2013 226 652.9, which was filed Dec. 19, 2013, and is incorporated herein by reference in its entirety.

TECHNICAL FIELD

Various embodiments relate generally to a method for operating a lighting device having two or more light generating units configured to generate a respective primary light beam and including a phosphor surface spaced apart from the light generating units. Various embodiments furthermore relate to a lighting device designed to carry out the method. Various embodiments are applicable e.g. to headlights, e.g. of motor vehicles, e.g. with AFS ("Adaptive Frontlighting System") or ADB ("Adaptive Driving Beam").

BACKGROUND

In order not to provoke any irritations for an observer of a dynamically variable image, an image refresh frequency should be sufficiently high or an image set-up time should be sufficiently short. For stationary image surfaces, e.g. screens for television pictures or videos, an image refresh frequency of at least 25 Hz is required. However, if light is projected into a far field at a distance of at least two meters, and if, in addition, the light emission pattern varies dynamically, a much higher image refresh frequency may be necessary in order to avoid irritations for an observer on account of image transitions not being perceived as fluid. In addition, in the case of projections into the far field, a much higher light power is typically required in order to achieve a sufficiently bright illumination. Therefore, in many cases, the dynamic light emission pattern in the far field cannot be generated or can be generated only in a very complex fashion by means of a single light source with sufficient dynamic range, e.g. cannot be generated by a single semiconductor light source such as an LED or a laser diode.

One possibility for providing an increased dynamic range consists in the use of a conventional light source having a high light power, e.g. a halogen lamp, downstream of which is disposed an optical unit moved by motor. However, this is very complex and not very robust and restricts a shaping of a light emission pattern to a small number of fixedly predefined shapes. So-called "leveling motors" are often used for the movement of the optical unit by motor.

A further possibility for providing an increased dynamic range consists in the use of an array of many LEDS ("LED array"), wherein respective subgroups of the LEDs are switched on depending on the desired light emission pattern. What is disadvantageous here is that a large number of LEDs must be kept available, only a minority of which are used in practice for a specific emission pattern. The degree of utilization is therefore low, which entails high costs, inter alia.

Moreover, a plurality of disjoint (non-overlapping) partial regions of a phosphor surface may be illuminated independently of one another by respective spaced-apart light generating units. What is disadvantageous in this case is that a high number of light generating units must be used. In practice, these light generating units are operated in a dimmed fashion most of the time, unless small, locally delimited, bright regions are intended to be generated in the light emission pattern. Consequently, a degree of utilization is low in this case, too. Moreover, spatially and temporally coordinating the respectively generated partial light emission patterns in order to generate a uniformly perceived total light emission pattern is difficult.

WO 2011/160680 A1 discloses a light source arrangement including a primary light source and a secondary light source, wherein the primary light source is designed to illuminate the secondary light source, wherein the secondary light source comprises a polyhedron having at least one first and one second phosphor surface, wherein the primary light source includes at least one laser or one light emitting diode, and wherein a drive mechanism is fixed to the primary light source or to the secondary light source.

US 2006/0227087 A1 discloses laser display systems which generate at least one scanning laser beam in order to excite one or more fluorescent materials on a screen which emits light in order to form images. The fluorescent materials may include phosphor materials.

EP 2 359 605 B1 discloses an illuminant including at least one semiconductor laser which is designed to emit a primary radiation having a wavelength of between 360 nm and 485 nm inclusive, and at least one conversion means which is disposed downstream of the semiconductor laser and is designed to convert at least part of the primary radiation into a secondary radiation having a longer wavelength different than the primary radiation, wherein the radiation emitted by the illuminant has an optical coherence length amounting to at most 50 micrometers, wherein the conversion means has a concentration of color centers or luminous points which amounts to at least $10^7/\mu m^3$ and the color centers or luminous points are distributed statistically in the conversion means, and wherein a focal spot of the conversion means that is irradiated by the primary radiation has an area of at most $0.5\ mm^2$.

SUMMARY

A method for operating a lighting device comprising n>1 light generating units configured to generate a respective primary light beam and comprising a phosphor surface spaced apart from the light generating units is provided. The method may include illuminating an i-th partial surface of the phosphor surface by i light generating units if a desired positive brightness value on this illuminated partial surface falls below or reaches a next higher i-th brightness threshold value from a group of n−1 positive, progressively increasing brightness threshold values; otherwise illuminating by n light generating units; wherein i and n are whole natural numbers and i=[1, . . . , n] holds true.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
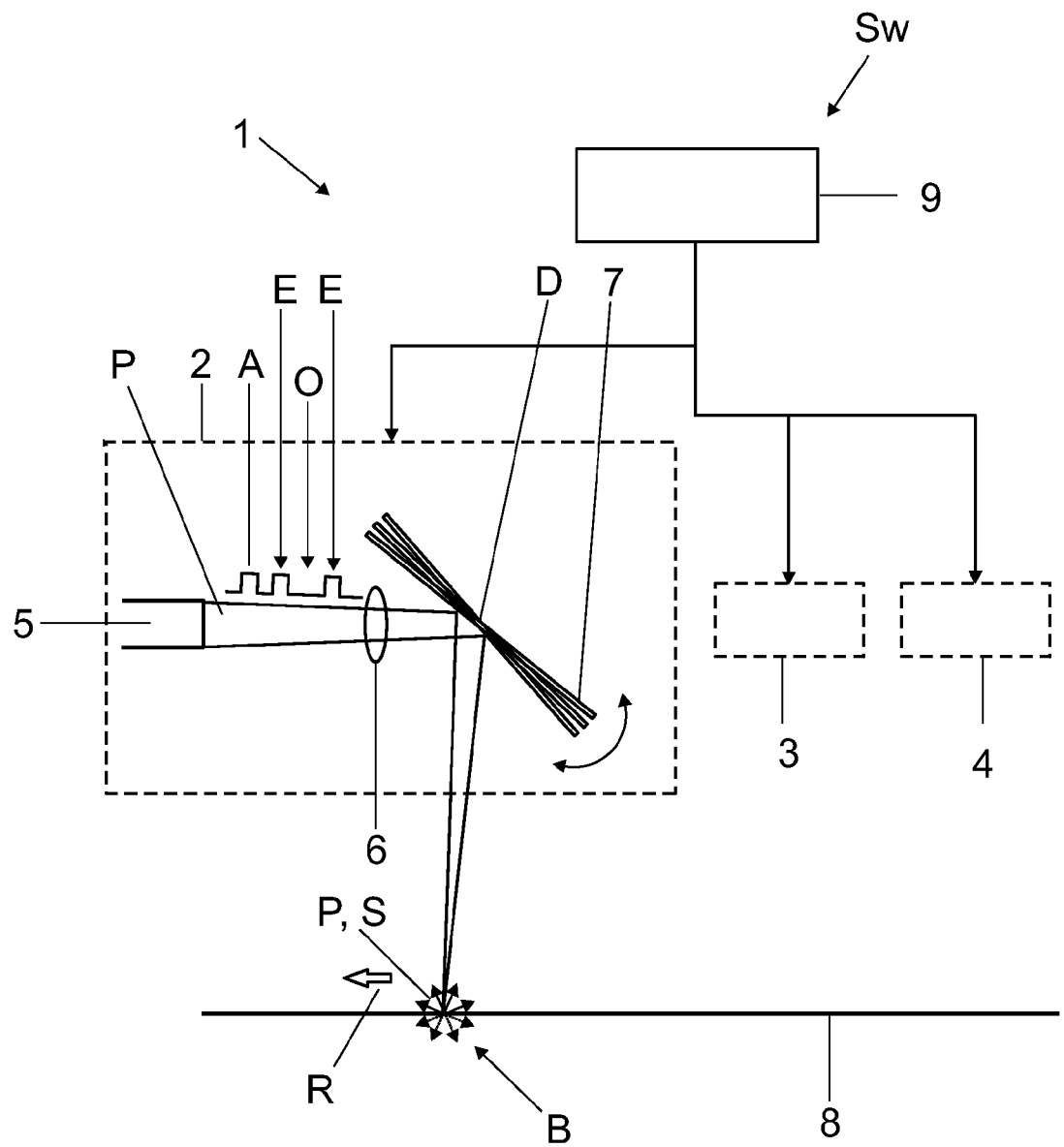
FIG. 1 shows, as a sectional illustration in plan view, a simplified schematic diagram of one possible basic construction of a lighting device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments may at least partly overcome the disadvantages of the prior art and may specify a possibility for providing a dynamically variable light emission pattern in a far field with a particularly high degree of utilization in conjunction with simple implementability. The far field may be, for example, a field or space at a distance of at least ten meters, e.g. of at least twenty-five meters.

Various embodiments provide a method for operating a lighting device including n>1 (i.e. two or more) light generating units configured to generate a respective primary light beam and incuding a phosphor surface spaced apart from the light generating units. The method may include: illuminating an i-th partial surface of the phosphor surface by i light generating units if a desired positive brightness value on this illuminated partial surface falls below or reaches a next higher i-th brightness threshold value from a group of n−1 positive, progressively increasing brightness threshold values; otherwise (in the case of desired brightness values above the (n−1)-th brightness threshold value): illuminating by n light generating units, wherein i and n are whole natural numbers and i=[1, . . . , n] holds true.

This method may make it possible to generate in a particularly effective and cost-effective manner on the phosphor surface a large-area light pattern (also referred to as "illumination pattern") with a high dynamic range of bright regions, and thus also a corresponding light emission pattern in a far field of the lighting device. The light generated by the phosphor surface may be imaged into the far field by a downstream optical unit ("secondary optical unit").

A phosphor surface may include at least one phosphor or conversion substance (colorant) which converts primary light incident thereon at least partly into secondary light having a different wavelength, e.g. a longer wavelength. This wavelength conversion is known in principle and need not be explained any further here. By way of example, a phosphor may convert incident blue primary light partly into yellow secondary light, such that overall blue-yellow or white mixed light having corresponding proportions of primary light and secondary light is emitted by the phosphor surface. In principle, however, a full conversion is also possible. The phosphor surface may be covered homogeneously or inhomogeneously with at least one phosphor.

In one development, at each region of the phosphor surface at which phosphor is present, white or whitish light, e.g. mixed light generated by only partial conversion, can be emitted by the phosphor surface. However, a use of two or more phosphor regions having different colors of the generated mixed light is likewise conceivable, in principle.

In one development, the light reflected or backscattered from the phosphor surface is used as useful light for generating the light emission pattern in the far field ("reflective arrangement"). Alternatively or additionally, light emerging at that side of the phosphor surface which faces away from the incident primary light may be used as useful light for generating a light emission pattern in the far field ("transmitted-light arrangement" or "transmissive arrangement").

The fact that n is a whole natural number encompasses the fact, for example, that n can be chosen from the range of numbers $[2, \ldots, \infty] \in \mathbb{N}$ (where n is arbitrary, but then fixed).

A brightness threshold value serves, therefore, to provide a condition for turning on an additional light generating unit. Consequently, there are also only (n−1) brightness threshold values, wherein the i-th brightness threshold value yields a condition for turning on the (i+1)-th light generating unit. If the case i=n is present, there is no longer a next higher brightness threshold value, and the n-th partial region is illuminated additively by n light generating units (this being what is known by the expression "otherwise").

In the case where n=2 light generating units are present, this method encompasses the fact, for example, that exactly one (n−1) positive brightness threshold value Th1 is present which is greater than zero. If a desired brightness value of a specific region of the phosphor surface (e.g. of a pixel) is below the brightness threshold value Th1, then this region is illuminated by only one light generating unit. The area of all such regions corresponds to the first ([i=1]-st) partial surface. The first partial surface may be continuous or non-continuous. If a desired brightness value of a specific region of the phosphor surface is above the brightness threshold value Th1, then this region is illuminated additively by all, that is to say both, light generating units. The area of all such doubly illuminated regions corresponds to the second ([i=n=2]-nd) partial surface. The second partial surface, too, may be continuous or non-continuous. If the desired brightness value corresponds to the brightness threshold value Th1, the associated region may optionally be assigned to the first or to the second partial surface.

If n=3 light generating units are present, the group of the brightness threshold values includes two brightness threshold values Th1 and Th2 where 0<Th1<Th2. A plurality of brightness threshold values increase e.g. progressively, that is to say that generally 0<...<Thi<...<Th[n−1] holds true. If a desired brightness value of a specific region of the phosphor surface (e.g. of a pixel) is below a first brightness threshold value Th1, then this region (which therefore belongs to the first partial surface) is illuminated by only one light generating unit. If a desired brightness value of a specific region of the phosphor surface is above the first brightness threshold value Th1 and below the second brightness threshold value Th2, then this region (which is therefore associated with the second partial surface) is illuminated additively by two of the light generating units. If the desired brightness value of a specific region of the phosphor surface is above the second brightness threshold value Th2, it is illuminated by all three light generating units and thus belongs to the third partial surface. If the desired brightness value corresponds to the second brightness threshold value Th2, the associated region may optionally be assigned to the second or to the third partial surface.

This method can be continued analogously for values n>3. A number of n=3 light generating units may be provided in various embodiments.

A light generating unit may include one or a plurality of light sources. The at least one light source may include e.g. at least one laser (e.g. a plurality of laser diodes arranged as a "laser stack"). The at least one light source may include e.g. one or a plurality of semiconductor light sources such as at least one LED or at least one laser diode. The light from a plurality of light sources may be combined or united into one light beam.

The spaced-apart phosphor surface provides a "remote phosphor" arrangement.

The method also encompasses the case where the entire illuminated phosphor surface is illuminated uniformly, e.g. if a desired brightness value of all regions thereof is below the first threshold value. This may correspond to a homogeneous illumination pattern in the case of a phosphor surface covered homogeneously with phosphor.

In one development, not all partial surfaces are utilized, that is to say that not all of the possible n partial surfaces in the case of n light generating units are generated additively. In various embodiments, at least one partial surface may be generated by two or even more light generating units being turned on. These two or more turned-on light generating units may illuminate e.g. the associated partial surface in close temporal succession, in the interlacing method or by illumination of separate or partly overlapping subregions. By way of example, in the case where three light generating units are present, in the case where a desired brightness of a region of the phosphor surface is below the first brightness threshold value, this region may be illuminated by only one light generating unit. In the case where a desired brightness of a region of the phosphor surface is above the first brightness threshold value, this region may be illuminated by three light generating units within the image set-up time.

In one configuration, a region of the phosphor surface which can be swept over or is swept over by an (i+1)-th light generating unit is smaller than a region of the phosphor surface which can be swept over or is swept over by an i-th light generating unit. As a result, a high dynamic range of brighter regions can also be achieved with light generating units of identical type. An (i+1)-th light generating unit therefore has a temporal reserve in order to illuminate the associated (i+1)-th region of the phosphor surface multiply at least in part within the predefined image set-up time. In other words, this (i+1)-th light generating unit has enough time within the image set-up time to illuminate a plurality of images or partial images in the associated region of the phosphor surface within the predefined image set-up time. The light generating units can be embodied comparatively inexpensively as a result. In various embodiments, wholly or partly non-overlapping (or wholly or partly disjoint) regions which can be swept over or are swept over can thus be excluded.

In another configuration, the phosphor surface can be swept over by the primary light beams in a line-like fashion. This allows a use of particularly simply constructed and/or drivable deflection units for deflecting the primary light beams onto the phosphor surface. By way of example, deflection systems including one or a plurality of mirrors may thus be used analogously to a so-called flying spot method or with at least one MEMS mirror.

Sweeping over encompasses the fact that a primary light beam is directed onto the phosphor surface line by line. The primary light beam may sweep over the lines always in the same direction or else e.g. in an alternating direction. An interlacing method may be used in this case.

In this case, the primary light beam need not be active the entire time and therefore need not also actually illuminate all regions of the phosphor surface which can be swept over in principle and which are thus illuminatable in principle. Rather the primary light beam can preferably be switched on and off or dimmed. This may be achieved for example by pulsed or clocked operation of the associated light generating unit wherein the pulses can be established by means of a predetermined activation pattern. As a result of the primary light beam being purposely switched on and off, it is thus possible to generate a desired illumination pattern on the phosphor surface in a simple manner.

The fact that a region of the phosphor surface which can be swept over by an (i+1)-th light generating unit is smaller than a region which can be swept over by an i-th light generating unit can be realized in this configuration for example by virtue of the (i+1)-th region having fewer lines than the i-th region. In other words, more lines are swept over in the case of the i-th region than in the case of the (i+1)-th region. In this case, not all of the regions, in particular pixels, swept over need also actually be illuminated. However, they are illuminatable as required and then generate a corresponding illumination pattern.

Sweeping over in a line-like fashion may take place horizontally or vertically. By way of example, for an application with a vehicle headlight, the phosphor surface may be swept over horizontally in order to obtain a correspondingly horizontally directed dynamic range of an adaptation of the light emission pattern, for example for implementing a dependence of a position of a brightest light spot on a lock during steering. Sweeping over in a line-like fashion horizontally may also be understood as sweeping over in a line-like fashion in the narrower sense, while sweeping over vertically can also be understood as "sweeping over in a column-like fashion".

In a further configuration, the phosphor surface can be swept over by the primary light beams over at least the full width. A change in the light emission pattern as well over a full possible width is thus made possible. This may be provided for example for changing a light emission pattern in front of a vehicle, e.g. during cornering or for edge illumination.

In yet another configuration, the phosphor surface is swept over by the primary light beams with the same line scanning time. This facilitates driving and selection of the light generating units. By way of example, comparatively inexpensive light generating units can thus be used.

Light generating units of identical type can be used e.g. in this configuration, too. This configuration may be used if the primary light beams describe the phosphor surface in a line-like fashion.

In one configuration, furthermore, the primary light beams of at least two of the light generating units have a different line scanning time. As a result, it is possible to achieve an improved dynamic range of the light emission pattern over the entire illuminatable phosphor surface. This configuration may afford the effect that slower light generating unit(s) can be used for a basic illumination and only a small number of more expensive light generating units (if appropriate only one light generating unit) with a fast line scanning time need be used for implementing the dynamic range. Moreover, the dynamic range of the faster light generating unit(s) can now be based on the partial illumination patterns already generated by the slower light generating unit(s), with the result that a smaller dynamic range is required. This in turn makes it possible to use faster light generating units that are still comparatively inexpensive.

In one configuration, moreover, the light generating units emit within an image set-up time a proportion of a total power of the primary light beams which corresponds at least approximately to a ratio of a number of its light sources to a total number of light sources of all the light generating units. A particularly high efficiency of the illumination of the phosphor surface can thus be achieved.

By way of example, a required total power (or a required luminous flux) in the case of three light generating units of identical type can be divided among three light beams, which each contribute approximately one third to the total power. In principle, however, any arbitrary division is possible. In various embodiments, an integral ratio of the partial powers may also be used, which corresponds to a use of a specific number of light sources (e.g. laser diodes) per light generating unit, e.g. 6:8:3 in the case of three light generating units with six, eight and three identical light sources.

A deviation from the theoretical proportion of the total power may be not more than 10%, e.g. not more than 7.5%, e.g. not more than 5%.

In one configuration, moreover, an image set-up time is not more than five milliseconds. Such an image set-up time, for example, makes it possible, for illumination in front of a vehicle, for example, but no irritations arise for passers-by and other road users. This takes account of the fact that the human eye can perceive the changes in the light distribution over time in the case of image set-up times of greater than 5 ms or in the case of image refresh frequencies lower than 200 Hz, depending on the individual and the traffic situation.

In one development, a deflection unit configured to deflect the primary light beam onto the phosphor surface in a line-like fashion comprises a mirror, e.g. an MEMS mirror, having a pivoting frequency of 25 kHz for single pivoting forward and backward. If pivoting forward of the MEMS mirror is used for sweeping over a line of the phosphor surface in one (e.g. horizontal or vertical) direction and pivoting backward or back is used for sweeping over a further line of the phosphor surface in an opposite direction, a line is swept over in 0.02 ms. This corresponds to a line frequency of 50 kHz. Given the image set-up time of 5 ms discussed above, this results in a maximum number of 250 lines of the primary light beam which can be swept over. For vehicle illumination by means of a headlight, for example, it may be provided for this number of lines at least to be achieved for setting up a light emission pattern.

In one configuration, moreover, a predetermined region of an illumination pattern is shifted on the phosphor surface. This encompasses, for example, pivoting of a partial region of an otherwise identical light distribution. In this regard, a brighter partial region, with its shape being at least substantially maintained, may be shifted, in particular laterally pivoted, over an otherwise substantially uniformly illuminated background region. This configuration can be implemented particularly effectively with the method described, in particular if the predetermined region is shifted along the lines. "Leveling motors" or the like can be dispensed with in this case, since the shifting is achieved only by means of local brightness changes on the phosphor surface.

This configuration may be provided for use as a light emission pattern of a vehicle headlight, since a predetermined light emission pattern (e.g. a low beam, a high beam, a fog light, etc.) can thus be adapted to a steering movement of the vehicle in a particularly simple and effective manner.

In another configuration, moreover, a plurality of light emission patterns are assigned to different illumination functions. This increases a diversity of the method. The illumination pattern on the phosphor surface can be shaped arbitrarily, in principle, for this purpose. For a high dynamic range it is advantageous if one or a plurality of bright regions form only part of the entire illumination pattern. This configuration may be provided for use as a light emission pattern of a vehicle headlight, since many known light functions can thereby be generated in a simple manner, e.g. a low beam, a high beam, a fog light, a daytime running light, etc.

Various embodiments provide a lighting device designed to carry out the method as described above. This lighting device may be embodied analogously to the method described above and may afford the same effects.

The lighting device includes, for example, two or more light generating units for generating a respective primary light beam, and an (integral or multipartite) phosphor surface spaced apart from the light generating units. In order that the phosphor surface can be swept over by the primary light beams, a respective deflection unit may be assigned to the light generating units. The deflection unit may include, for example, one or a plurality of mirrors. An MEMS ("Micro Electro Mechanical System") mirror may be provided. The MEMS mirror may be pivotable in a line-like fashion in one direction (e.g. a y-direction) and pivotable step by step in the other direction (e.g. an x-direction), for example for implementing a line advance. The deflection unit may be integrated into the associated light generating unit or may be a functional part which is separate, e.g. can be installed separately, therefrom. An optical unit ("primary optical unit") may be disposed downstream of the at least one light source of a light generating unit in order to shape, e.g. to focus or to collimate, the primary light beam before impinging on the phosphor layer. The primary optical unit may be integrated into the light generating unit.

In one configuration, the lighting device is a vehicle headlight or a part thereof (e.g. a module). The vehicle may be for example a land-bound motor vehicle, but e.g. also an aircraft such as an airplane or a helicopter, or a watercraft such as a ship. The land-bound motor vehicle may be e.g. an automobile or a truck.

In another configuration, the lighting device of the vehicle headlights is an AFS or ADB headlight. This denotes, for example, a headlight whose light emission pattern (e.g. a low beam) can be adapted (e.g. widened and/or shifted) depending on the state of the vehicle (e.g. a speed, a rain activity, a lock during steering, etc.), and/or of the driver (the latter's fatigue, etc.) and the traffic situation (oncoming traffic, vehicles ahead, etc.). In other words, the vehicle headlight can be used with an AFS or ADB system.

FIG. 1 shows a lighting device 1 for a vehicle headlight Sw. The lighting device 1 here includes three identically constructed light generating units 2, 3 and 4, of which the first light generating unit 2 is illustrated in greater detail and will be explained more precisely below.

The first light generating unit 2 comprises a light source in the form of a laser diode 5, which emits a blue primary light beam P through a primary optical unit, indicated as lens 6, onto a deflection mirror 7 acting as a deflection unit.

The deflection mirror 7 has a rotation axis D aligned vertically here (perpendicularly to the plane of the drawing). The deflection mirror 7 is shown in three possible rotational positions, but in principle is freely pivotable forward and backward between two end positions. The deflection mirror 7 deflects the primary light beam P onto a phosphor surface 8 covered with a phosphor layer.

The light generating units 2, 3 and 4 are individually drivable, namely in a clocked fashion purely by way of example here. As a result, the primary light beam P emitted by said units also corresponds to a temporally clocked sequence A of on states (light intensity >0 or light on) E and off states (light intensity=0 or light off) O, e.g. in a manner similar to a bit pattern or a pulse sequence.

The primary light beam P is deflected onto the phosphor surface 8 in a manner with line-like scanning. This may be implemented, for example, by virtue of the deflection mirror 7 being pivoted forward and backward between the two end positions in such a way that the primary light beam P sweeps over the phosphor surface 8 in a straight line. This is indicated here by a direction R of movement. In this case, the primary light beam P can generate a corresponding illumination pattern on the phosphor surface 8 depending on its on and off states E and O. For a line advance, that is to say a line change, the deflection mirror 7 may be pivoted for example step by step about a further rotation axis (not illustrated) lying in the mage plane and in the mirror plane. For this purpose, the deflection mirror 7 may be embodied as an MEMS mirror.

Where the primary light beam P impinges on the phosphor surface 8, it is converted at least partly into secondary light S having a longer wavelength, e.g. into yellow light. Consequently, mixed light P, S having proportions of primary light P and secondary light S, e.g. blue-yellow or white mixed light P, S, is emitted by a corresponding focal spot B on the phosphor surface 8. Depending on the embodiment of the lighting device 1, the mixed light P, S reflected from the phosphor surface 8 may be used as useful light for generating a light emission pattern in the far field, as indicated by the solid arrows at the focal spot B ("reflection arrangement"). Alternatively or additionally, the mixed light P, S emerging at that side of the phosphor surface 8 which faces away from the incident primary light beam P may be used as useful light for generating a light emission pattern in the far field, as indicated by the plotted arrows at the focal spot B ("transmitted-light arrangement").

Each of the light generating units 2, 3 and 4 can in principle sweep over and thus optionally also illuminate an identical region of the phosphor surface 8. However, they can also be driven in such a way that they sweep over only a partial region thereof. The illumination sequence with which the primary light beam P is modulated and the partial region of the phosphor surface 8 which is actually swept over by a light generating unit 2, 3, 4 may be predefined for example by a control unit 9 (e.g. a driver electronic unit). The control unit 9 can receive its control commands for example from an image recognition unit (not illustrated), for example a camera with image capture and image evaluation software.

Figure 2:
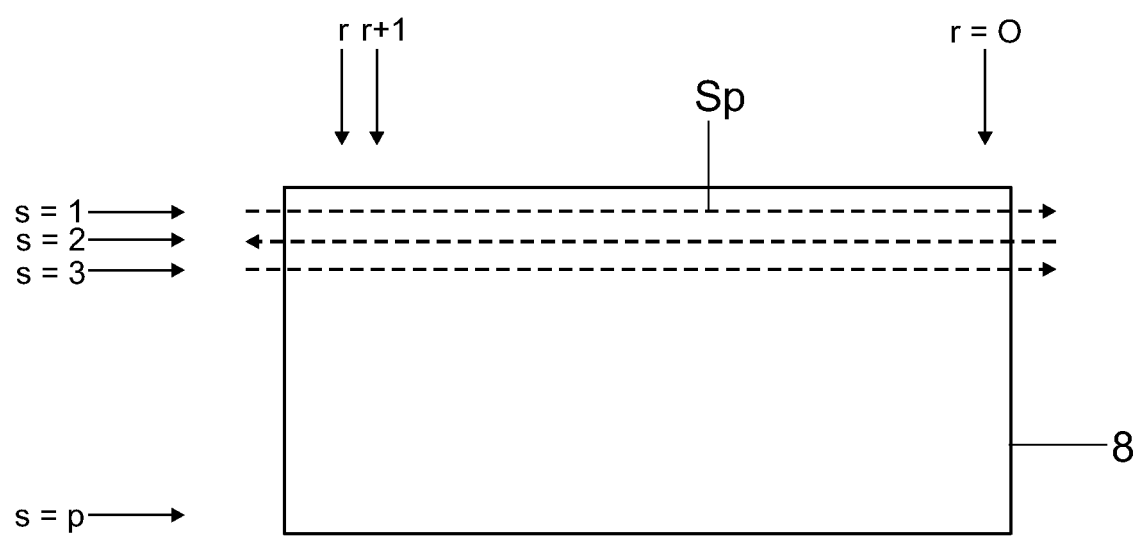
FIG. 2 shows a phosphor surface of the lighting device in a frontal view.

FIG. 2 shows the phosphor surface 8 in a frontal view with a track Sp of a primary light beam P on the phosphor surface 8. The track Sp is composed of p horizontally running lines s, which are indicated by the dashed arrows and which are traversed by the primary light beam P in the course of a pivoting of the deflection mirror 7 about the rotation axis D. The total number p of lines s may be e.g. 200 or 250. Each of the lines s has a maximum of r=o pixels, e.g. where o=640, 800 or 1024. As a result, an (o×p)-shaped focal spot pattern or illumination pattern can be generated on the phosphor surface 8. In this case, the focal spot B corresponds in particular to a pixel of a light emission pattern projected into the far field. The track Sp of the primary light beam P may extend beyond the phosphor surface 8. In the course of a continuous pivoting of the deflection mirror 7, the physical resolution may likewise be continuous, such that no "genuine" pixels need exist on the phosphor surface 8. Pixels may arise e.g. only virtually as a result of the sequence A of the on states E and off states O of the laser 5.

It may be provided for an image refresh frequency (e.g. the number of illumination cycles on the phosphor surface 8 per second for sweeping over all p lines s) to be at least 200 Hz, such that the generation of the individual pixels can no longer be resolved temporally by a human eye even at a relatively great distance. An image set-up time may be not more than 5 milliseconds.

Figure 3:
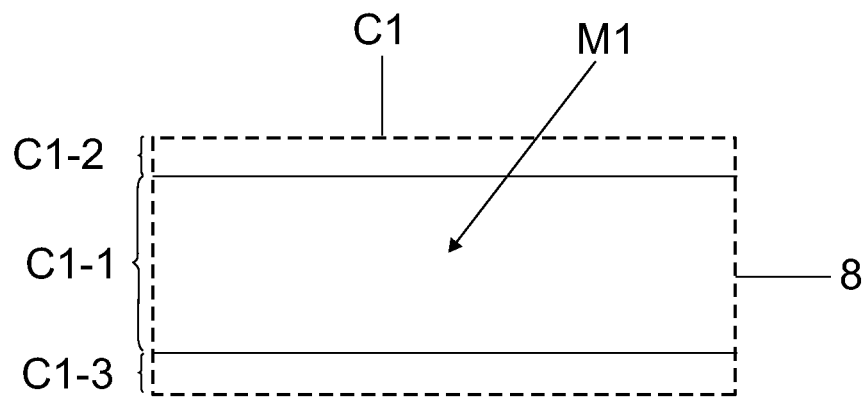
FIGS. 3 to 7 show in front view the phosphor surface such as is illuminatable in each case by a first to third light generating unit.

FIG. 3 shows in front view the phosphor surface 8 such as is illuminatable by the first light generating unit 2. Specifically, this figure shows the maximally illuminatable illumination pattern M1, in the case of which all p lines s can be swept over in regard to their full width and are also illuminated. Thus, the first (illumination) region C1, which is illuminatable by the first light generating unit 2 corresponds to the entire phosphor surface 8.

Figure 6:
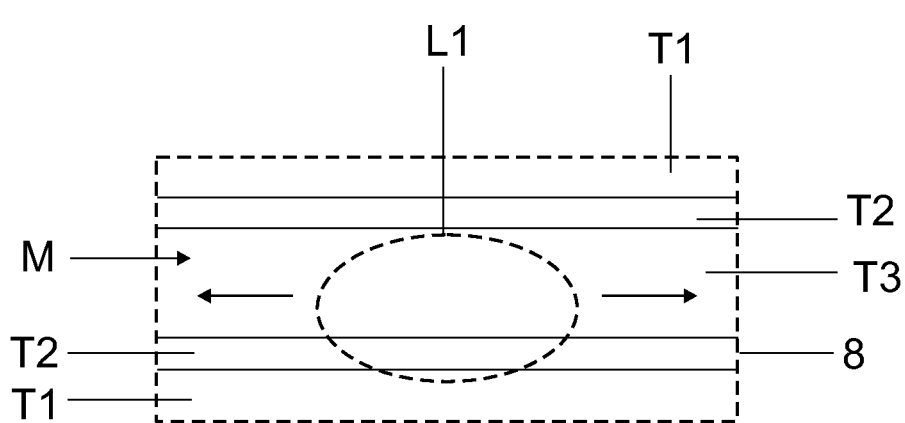

The first light generating unit 2 here illuminates all regions of the phosphor surface 8 such that they are luminous with up to 13% of the maximum intensity of the entire illumination pattern (see FIG. 6). This value corresponds to a first brightness threshold value. In other words, the first light generating unit 2 "takes over" all intensities up to the first brightness threshold value of 13% of the maximum of the entire illumination pattern.

The number of lines s theoretically illuminatable by the first light generating unit 2 within the image set-up time of e.g. five milliseconds here is, purely by way of example, higher than the total number p of all lines s actually present, and so some lines s can be swept over twice. As a result, a central illumination region C1-1 can be illuminated more frequently than edge regions C1-2 and C1-3 at the top side and underside and, consequently, can be more brightly luminous (up to max. 13% of the maximum intensity).

The illumination region C1 is set by the control unit 9, for example depending on a desired light emission pattern, e.g. a low beam, a high beam, etc.

Figure 4:
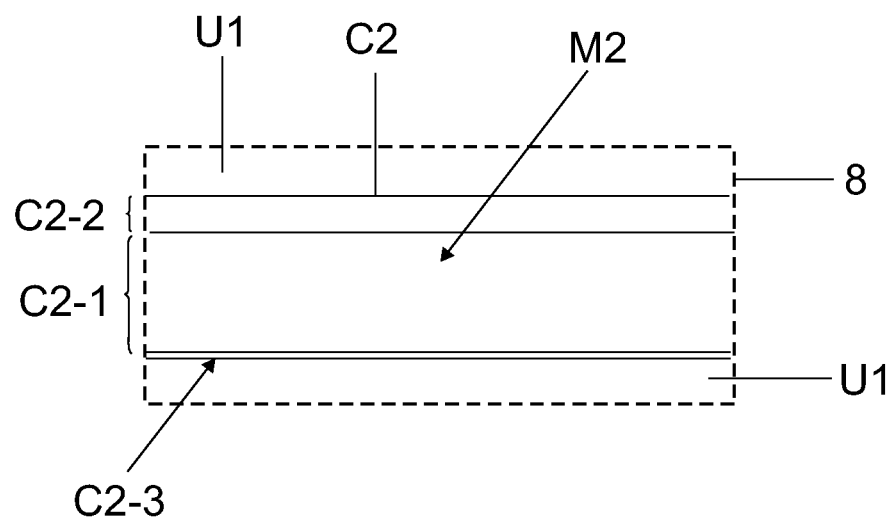

FIG. 4 shows in front view the phosphor surface 8 such as is illuminatable in principle by the second light generating unit 3. Specifically, this figure shows the maximally illuminatable illumination pattern M2 analogously to the illumination pattern M1. In contrast to the illumination pattern M1, here only a part of the entire phosphor surface 8 is illuminated, namely a second illumination region C2. The latter is a genuine partial surface of the first illumination region C1, that is to say C2 ⊂ C1. Generally, however, the illumination regions C1 and C2 may also be of the same size. The lines illuminated by the second light generating unit 3 constitute, for example, a genuine subset of the lines of the central region C1-1 of the first illumination region C1.

Regions of the phosphor surface 8 which have a desired brightness of more than the first brightness threshold value of 13% are illuminated in the second illumination region C2. The second light generating unit 3 illuminates these regions additively up to a second brightness threshold value of 35%. By the second light generating unit 3, therefore, an increase in brightness of up to 22% of the maximum intensity is achieved in the second illumination region C2. This high swing is achieved by virtue of the fact that the second illumination region C2 makes up only approximately 60% of the first illumination region C1 and, consequently, has a higher a temporal reserve in order to illuminate a plurality of the lines s multiply as well. In the embodiment shown, a central region C2-1 is illuminated more frequently than edge regions C2-2 and C2-3 at the top side and underside of the second illumination region C2. Consequently, the central region C2-1 is more brightly luminous with up to 35% (additively) of the maximum intensity. Regions U1 of the phosphor surface 8 which lie outside the second illumination region C2 are not illuminated by the second light generating unit 3 (but by the first light generating unit 2).

Figure 5:
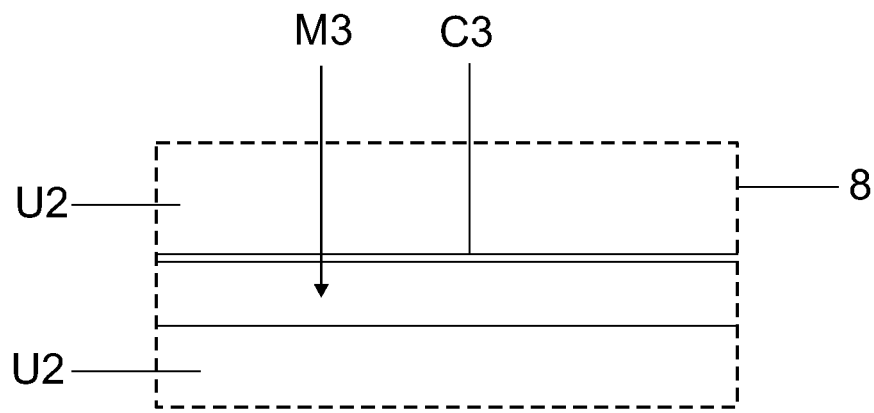

As shown in FIG. 5, the third light generating unit 4 additionally illuminates a third illumination region C3, which is intended to have regions having a brightness above the second brightness threshold value of 35% (that is to say a region having a desired brightness threshold value of between 35% and 100% of the maximum brightness). By the third light generating unit 4, therefore, an increase in brightness of up to 65% of the maximum intensity is achieved in the third illumination region C3. This high swing is achieved by virtue of the fact that the third illumination region C2 makes up only approximately 30% of the first illumination region C1 and, consequently, has an even higher temporal reserve in order to illuminate the associated lines s multiply. Regions U2 of the phosphor surface 8 which lie outside the third illumination region C3 are not illuminated by the third light generating unit 4 (but partly only by the first light generating unit 2 and partly additionally by the second light generating unit 3).

FIG. 6 shows in front view the phosphor surface 8 such as is jointly illuminatable additively by the first to third light generating units. The resulting total illumination pattern M is therefore a superimposition of the illumination patterns M1, M2 and M3.

The total illumination pattern M therefore has a first partial region T1, which is illuminated only by the first light generating unit 2, namely with a brightness up to the first brightness threshold value of 13%. Said first partial region T1 corresponds to an intersection of the illumination regions C1, U1 and U2, that is to say T1=C1∩U1∩U2.

The total illumination pattern M furthermore has a second partial region T2, which is illuminated by the first light generating unit 2 and the second light generating unit 3. Said second partial region T2 emits light having a brightness between the first brightness threshold value and the second brightness threshold value of 35%. The second partial region T2 corresponds to an intersection of the illumination regions C1 and C2, that is to say T2=C1∩C2.

The total illumination pattern M additionally has a third partial region T3, which is illuminated by all light generating units 2 to 4 and which emits light having a brightness above the second brightness threshold value of 35%. The third partial region T3 corresponds to an intersection of all illumination regions C1, C2 and C3, that is to say T3=C1∩C2∩C3.

The total illumination pattern M corresponds to a union of the illumination regions C1, C2 and C3, i.e. T1=C1∪C2∪C3.

Overall, the three light generating units 2, 3 and 4 preferably each emit a power corresponding to approximately one third of the total power. The powers of the light generating units 2, 3 and 4 may correspond e.g. to 33.2%, 31.4% and respectively 35.4% of the total power, which corresponds to a deviation of less than 10% from the theoretical mean value of 33%, specifically of less than 6%.

In order to generate a specific light emission pattern in the far field, e.g. a low beam, a predetermined region or segment L1 of the theoretically illuminatable illumination pattern M shown in FIG. 6 can then actually be illuminated, e.g. by the laser diodes 5 being correspondingly switched on and off. The other region of the illumination pattern M may not be generated.

By a simple change in the sequence A of on states E and off states O, it is possible for said segment L1 to be shifted in particular toward the left or right (as indicated by the arrows), without its shape being changed. By way of example, this may be carried out in the context of an AFS as a reaction to a lock during steering. In this case, e.g. a shape of the segment L1 may be adapted (e.g. widened and/or shifted) to a state of the vehicle (e.g. a speed, a rain activity, a lock during steering, etc.). This is achieved without leveling motors.

Figure 7:
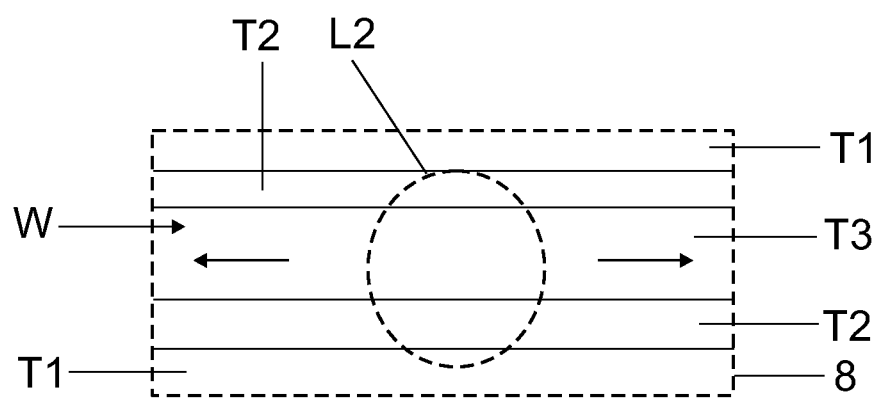

FIG. 7 shows a front view of the phosphor surface 8 such as is jointly illuminatable alternatively by the first to third light generating units 2 to 4. Here the illumination pattern W that is illuminatable in principle is now mirrored at a horizontal in comparison with the illumination pattern M. In this regard, e.g. the illumination pattern W may be provided for generating a high beam. One region or segment L2 from the illumination pattern W is used for generating the high beam. The other region of the illumination pattern W is e.g. not generated.

Although the invention has been described and illustrated more specifically in detail by means of the exemplary embodiments shown, nevertheless the invention is not restricted thereto and other variations can be derived therefrom by the person skilled in the art, without departing from the scope of protection of the invention.

In this regard, the light generating units may alternatively or additionally have different line scanning times. In one development, they can then all illuminate the entire (illuminatable) phosphor surface. In various embodiments, the first light generating unit may have a shorter line scanning time than the second light generating unit, and the second light generating unit may have a shorter line scanning time than the third light generating unit.

Generally, the brightness threshold values may also be divided in a different ratio, for example in a manner adapted to a logarithmic brightness perception of the human eye in the daytime, or to a brightness perception of the human eye that takes effect at twilight or in darkness.

Left and right vehicle headlights can have different configurations of the described properties, features and effects of these embodiments.

Moreover, the light sources of the light generating units can have different beam powers.

The MEMS mirrors can be operated in a resonant or non-resonant fashion.

Generally, "a(n)", "one", etc., can be understood to mean a singular or a plural, in particular in the sense of "at least one" or "one or a plurality" etc., as long as this is not explicitly excluded, e.g. by the expression "exactly one", etc.

Moreover, a numerical indication can encompass exactly the indicated number and also a customary tolerance range, as long as this is not explicitly excluded.

REFERENCE SIGNS

1 Lighting device
2 Light generating unit
3 Light generating unit
4 Light generating unit
5 Laser diode
6 Lens
7 Deflection mirror 8 Phosphor surface
9 Control unit
A Sequence
B Focal spot
C1 Illumination region
C1-1 Central illumination region
C1-2 Edge region at the top side
C1-3 Edge region at the underside
C2 Illumination region
C2-1 Central illumination region
C2-2 Edge region at the top side
C2-3 Edge region at the underside
C3 Illumination region
D Rotation axis
E On state
L1 Segment of the illumination pattern M
L2 Segment of the illumination pattern W
M Total illumination pattern
M1 Illumination pattern
M2 Illumination pattern
O Off state
P Primary light beam
p Horizontally running line
P,S Mixed light
R Direction of movement
r Vertically running column
S Secondary light
s Horizontally running line
Sp Track of the primary light beam
Sw Vehicle headlight
T1 First partial region of the total illumination pattern
T2 Second partial region of the total illumination pattern
T3 Third partial region of the total illumination pattern
U1 Region outside the illumination region C2
U2 Region outside the illumination region C3
W Illumination pattern While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating a lighting device, the lighting device comprising a first light generating unit, a second light generating unit and a third light generating unit configured to generate a respective primary light beam, and the lighting device further comprising a pre-determined set of two positive, progressively increasing brightness threshold values and a phosphor surface spaced apart from the light generating units, the method comprising:

illuminating a partial surface of the phosphor surface by one, two or all three of said light generating units by sweeping over the respective primary light beams generated by said light generating units in a line-like fashion;

wherein said partial surface of the phosphor surface is illuminated by the first light generating unit when a desired positive brightness value on said partial surface of the phosphor surface falls below or reaches the first brightness threshold value from said set of two positive, progressively increasing brightness threshold values, wherein said partial surface of the phosphor surface is illuminated by the first light generating unit and the second light generating unit when a desired positive brightness value on said partial surface of the phosphor surface falls below or reaches the second brightness threshold value, wherein said partial surface of the phosphor surface is illuminated by the first light generating unit, the second light generating unit and the third light generating when a desired positive brightness value on said partial surface of the phosphor surface exceeds the second brightness threshold value; and wherein a region of the partial surface of the phosphor surface which is swept over by the primary light beam generated by the third light generating unit is smaller than a region of the partial surface of the phosphor surface which is swept over by the primary light beam generated by the second light generating unit; and a region of the partial surface of the phosphor surface which is swept over by the primary light beam generated by the second light generating unit is smaller than a region of the partial surface of the phosphor surface which is swept over by the primary light beam generated by the first light generating unit.

2. The method of claim 1, wherein the phosphor surface can be swept over by the primary light beams over at least the full width.

3. The method of claim 1, wherein the phosphor surface is swept over by the primary light beams with the same line scanning time.

4. The method of claim 1, wherein the primary light beams of at least two of the light generating units have a different line scanning time.

5. The method of claim 1, wherein the light generating units emit within an image set-up time a proportion of a total power of the primary light beams which corresponds at least approximately to a ratio of a number of its light sources to a total number of light sources of all the light generating units, wherein the image set-up time is the time required to illuminate the phosphor surface with the light of the light generating units.

6. The method of claim 1, wherein an image set-up time is not more than five milliseconds.

7. The method of claim 1, wherein a predetermined region of an illumination pattern is shifted on the phosphor surface.

8. The method of claim 1, wherein different illumination functions are assigned to a plurality of light emission patterns.

* * * * *